United States Patent
Zhang

(10) Patent No.: US 8,470,215 B2
(45) Date of Patent: Jun. 25, 2013

(54) PROCESS FOR MANUFACTURING BREAKABLE CAPSULES USEFUL IN TOBACCO PRODUCTS

(75) Inventor: Wenhui Zhang, Beijing (CN)

(73) Assignee: R. J. Reynolds Tobacco Company, Winston-Salem, NC (US)

( * ) Notice: Subject to any disclaimer, the term of this patent is extended or adjusted under 35 U.S.C. 154(b) by 518 days.

(21) Appl. No.: 12/526,760

(22) PCT Filed: Jan. 25, 2008

(86) PCT No.: PCT/CN2008/070182
§ 371 (c)(1),
(2), (4) Date: Aug. 11, 2009

(87) PCT Pub. No.: WO2009/094859
PCT Pub. Date: Aug. 6, 2009

(65) Prior Publication Data
US 2010/0294290 A1 Nov. 25, 2010

(51) Int. Cl.
*B29B 9/12* (2006.01)
*A24D 3/04* (2006.01)

(52) U.S. Cl.
USPC .................................... 264/4; 131/328

(58) Field of Classification Search
None
See application file for complete search history.

(56) References Cited

U.S. PATENT DOCUMENTS

| | | |
|---|---|---|
| 2,800,457 A | 7/1957 | Green et al. |
| 2,808,057 A | 10/1957 | Jaksch |
| 2,863,461 A | 12/1958 | Frost, Jr. |
| 3,041,289 A | 6/1962 | Katchen et al. |
| 3,066,681 A | 12/1962 | Cohn |
| 3,297,038 A | 1/1967 | Homburger |
| 3,334,636 A | 8/1967 | Zuber |
| 3,339,557 A | 9/1967 | Karalus |
| 3,339,558 A | 9/1967 | Waterbury |
| 3,366,121 A | 1/1968 | Carty |
| 3,390,686 A | 7/1968 | Irby, Jr. et al. |
| 3,428,049 A | 2/1969 | Leake et al. |
| 3,508,558 A | 4/1970 | Seyburn |
| 3,513,859 A | 5/1970 | Carty |
| 3,515,146 A | 6/1970 | Nealis |
| 3,525,582 A | 8/1970 | Waterbury |

(Continued)

FOREIGN PATENT DOCUMENTS

| | | |
|---|---|---|
| CN | 1915440 A | 2/2007 |
| EP | 513603 A1 | 11/1992 |

(Continued)

*Primary Examiner* — Mary F Theisen
(74) *Attorney, Agent, or Firm* — Brinks Hofer Gilson & Lione

(57) ABSTRACT

A method for manufacturing breakable capsules (50) that are useful for incorporating into a tobacco product (10), such as smoking articles and smokeless tobacco products, is provided. The method comprises forming a plurality of droplets comprising a core composition and a coating composition. The coating composition comprises a material that gelates in contact with a multivalent ion. The method also comprises introducing the plurality of droplets in a first aqueous solution having a first concentration of a first multivalent ion such that the coating composition of the plurality of droplets gelates to form a plurality of raw capsules. The method further comprises introducing the plurality of raw capsules in a second aqueous solution having a second concentration of a second multivalent ion, wherein the second concentration is higher than the first concentration, such that the coating composition of the plurality of raw capsules hardens to form a plurality of breakable capsules (50).

30 Claims, 1 Drawing Sheet

U.S. PATENT DOCUMENTS

| | | | |
|---|---|---|---|
| 3,547,130 A | 12/1970 | Harlow et al. |
| 3,575,180 A | 4/1971 | Carty |
| 3,596,665 A | 8/1971 | Lindgard |
| 3,602,231 A | 8/1971 | Dock |
| 3,602,235 A | 8/1971 | Dock |
| 3,625,228 A | 12/1971 | Dock |
| 3,635,226 A | 1/1972 | Horsewell et al. |
| 3,669,128 A | 6/1972 | Cohen |
| 3,685,521 A | 8/1972 | Dock |
| 3,916,914 A | 11/1975 | Brooks et al. |
| 3,943,940 A | 3/1976 | Minami |
| 3,972,335 A | 8/1976 | Tiggelbeck et al. |
| 3,991,773 A | 11/1976 | Walker |
| 4,082,098 A | 4/1978 | Owens, Jr. |
| 4,281,671 A | 8/1981 | Bynre et al. |
| 4,701,326 A | 10/1987 | Nelsen et al. |
| 4,729,391 A | 3/1988 | Woods et al. |
| 4,780,987 A | 11/1988 | Nelsen et al. |
| 4,862,905 A | 9/1989 | Green, Jr. et al. |
| 4,889,144 A | 12/1989 | Tateno et al. |
| 4,941,486 A | 7/1990 | Dube et al. |
| 4,956,481 A | 9/1990 | Gillaspey et al. |
| 5,012,829 A | 5/1991 | Thesing et al. |
| 5,021,184 A | 6/1991 | Gillaspey et al. |
| 5,041,422 A | 8/1991 | Narula et al. |
| 5,093,130 A | 3/1992 | Fujii et al. |
| 5,139,783 A | 8/1992 | Handjani et al. |
| 5,186,185 A | 2/1993 | Mashiko et al. |
| 5,223,185 A | 6/1993 | Takei et al. |
| 5,240,015 A | 8/1993 | Rosen et al. |
| 5,303,720 A | 4/1994 | Banerjee et al. |
| 5,387,093 A | 2/1995 | Takei |
| 5,387,416 A | 2/1995 | White et al. |
| 5,593,684 A | 1/1997 | Baker et al. |
| 5,727,571 A | 3/1998 | Meiring et al. |
| 5,882,680 A | 3/1999 | Suzuki et al. |
| 6,174,466 B1 * | 1/2001 | Kiefer et al. ................ 264/4.4 |
| 6,270,836 B1 | 8/2001 | Holman |
| 6,470,894 B2 | 10/2002 | Hersh et al. |
| 6,627,236 B1 | 9/2003 | Barbeau et al. |
| 6,631,722 B2 | 10/2003 | MacAdam et al. |
| 6,719,933 B2 | 4/2004 | Nakamura et al. |
| 6,949,256 B2 | 9/2005 | Fonkwe et al. |
| 7,115,085 B2 | 10/2006 | Deal |
| 7,237,558 B2 | 7/2007 | Clark et al. |
| 7,240,678 B2 | 7/2007 | Crooks et al. |
| 7,249,605 B2 | 7/2007 | MacAdam et al. |
| 2002/0020420 A1 | 2/2002 | Xue et al. |
| 2002/0166563 A1 | 11/2002 | Jupe et al. |
| 2003/0098033 A1 | 5/2003 | MacAdam et al. |
| 2004/0074507 A1 | 4/2004 | MacAdam et al. |
| 2004/0224020 A1 | 11/2004 | Schoenhard |
| 2004/0234590 A1 | 11/2004 | Mane et al. |
| 2004/0261807 A1 | 12/2004 | Dube et al. |
| 2005/0070409 A1 | 3/2005 | Deal |
| 2005/0123601 A1 | 6/2005 | Mane et al. |
| 2005/0196437 A1 | 9/2005 | Bednarz et al. |
| 2005/0244521 A1 | 11/2005 | Strickland et al. |
| 2005/0249676 A1 | 11/2005 | Scott et al. |
| 2005/0260266 A1 | 11/2005 | Gebreselassie et al. |
| 2006/0144412 A1 | 7/2006 | Mishra et al. |
| 2006/0272663 A1 | 12/2006 | Dube et al. |
| 2006/0293157 A1 | 12/2006 | Deal |
| 2007/0012327 A1 | 1/2007 | Karles et al. |
| 2007/0068540 A1 | 3/2007 | Thomas et al. |
| 2007/0186941 A1 | 8/2007 | Holton, Jr. et al. |
| 2007/0207239 A1 | 9/2007 | Neidle et al. |
| 2008/0029117 A1 | 2/2008 | Mua et al. |
| 2008/0302373 A1 | 12/2008 | Stokes et al. |
| 2009/0025738 A1 | 1/2009 | Mua et al. |
| 2009/0025739 A1 | 1/2009 | Brinkley et al. |

FOREIGN PATENT DOCUMENTS

| | | |
|---|---|---|
| KR | 1999-31274 | 5/1999 |
| KR | 2000-52283 | 8/2000 |
| WO | WO 03/009711 A1 | 2/2003 |
| WO | WO 2005/041699 A2 | 5/2005 |
| WO | WO 2006/119660 A1 | 11/2006 |
| WO | WO 2006/136197 A1 | 12/2006 |
| WO | WO 2006/136199 A1 | 12/2006 |
| WO | WO 2007/010407 A2 | 1/2007 |
| WO | WO 2007/060543 A2 | 5/2007 |

* cited by examiner

PROCESS FOR MANUFACTURING BREAKABLE CAPSULES USEFUL IN TOBACCO PRODUCTS

FIELD OF THE INVENTION

The present invention relates to breakable capsules, a process for manufacturing same, and tobacco products, such as smoking articles and smokeless tobacco products, incorporating same.

BACKGROUND OF THE INVENTION

The sensory attributes of cigarette smoke can be enhanced by applying additives to tobacco and/or by otherwise incorporating flavoring materials into various components of a tobacco product, such as a smoking article or a smokeless tobacco product, such as a snus pouch. Various methods for modifying the sensory attributes of cigarettes suggest that filter elements may be used as vehicles for adding flavor to the mainstream smoke of those smoking articles. For example, U.S. Pat. Appl. Pub. No. 2002/0166563 to Jupe et al. proposes the placement of adsorbent and flavor-releasing materials in a cigarette filter. U.S. Pat. Appl. Pub. No. 2002/0020420 to Xue et al. proposes the placement of fibers containing small particle size adsorbents/absorbents in the filter. U.S. Pat. No. 4,941,486 to Dube et al. and U.S. Pat. No. 4,862,905 to Green, Jr. et al. propose the placement of a flavor-containing pellet in a cigarette filter. Other representative types of cigarette filters incorporating flavoring agents are set forth in U.S. Pat. No. 3,972,335 to Tiggelbeck et al.; U.S. Pat. No. 4,082,098 to Owens, Jr.; U.S. Pat. No. 4,281,671 to Byrne; U.S. Pat. No. 4,729,391 to Woods et al.; and U.S. Pat. No. 5,012,829 to Thesing et al. The flavoring materials may vary. See, Borschke, *Rec. Adv. Tab. Sci.*, 19, p. 47-70, 1993; Leffingwell et al., *Tobacco Flavoring for Smoking Products*, R. J. Reynolds Tobacco Company (1972). For example, one type of flavoring materials is menthol.

In another example, some smoking articles have capsules positioned in their filter elements, and the contents of those capsules are released into the filter elements upon rupture of those capsules in order to deodorize the filter element after the smoking article is extinguished. See, for example, U.S. Pat. No. 3,339,558 to Waterbury; U.S. Pat. No. 3,366,121 to Carty; U.S. Pat. No. 3,390,686 to Irby, Jr. et al.; U.S. Pat. No. 3,428,049 to Leake; U.S. Pat. No. 3,547,130 to Harlow et al; U.S. Pat. No. 3,575,1809 to Carty; U.S. Pat. No. 3,602,231 to Dock; U.S. Pat. No. 3,625,228 to Dock; U.S. Pat. No. 3,635,226 to Horsewell et al.; U.S. Pat. No. 3,685,521 to Dock; U.S. Pat. No. 3,916,914 to Brooks et al.; U.S. Pat. No. 3,991,773 to Walker; U.S. Pat. No. 4,889,144 to Tateno et al. and U.S. Pat. No. 7,115,085 to Deal; U.S. Pat. Application Pub. Nos. 2003/0098033 to MacAdam et al.; 2004/0261807 to Dube et al; and 2007/0068540 to Thomas et al.; and PCT WO 03/009711 to Kim; and U.S. patent application Ser. No. 11/760,983, filed Jun. 11, 2007 to Stokes et al. The flavor-releasing materials may be released into the filter elements upon rupture of those capsules in the attempt to alter the nature or character of the mainstream smoke that passes through those filter elements. For example, some smokers might desire a smoking article that is capable of selectively providing a variety of different flavors, depending upon the smoker's immediate desire. The flavor of such a smoking article might be selected based on the smoker's desire for a particular flavor at that time, or a desire to change flavors during the smoking experience. For example, flavors during the smoking experience may enable a smoker to end the smoking article with a breath freshening flavor, such as menthol or spearmint. Accordingly, it would be desirable to provide a smoking article that is capable of providing distinctive, different pleasurable sensory experiences, at the discretion of a smoker, for example, by crushing the capsule incorporated in the filter and containing the flavoring materials.

Additionally, some smokers might also desire a smoking article that is capable of selectively releasing a deodorizing agent upon completion of the smoking experience. Such agents may be used to ensure that the remaining portion of a smoked article yields a pleasant aroma after the smoker has finished smoking that smoking article. Accordingly, it is desirable to provide a smoking article that is capable of releasing a deodorizing agent, particularly at the discretion of the smoker, for example, by crushing the capsule incorporated in the filter and containing the deodorizing agent.

In yet another example, some smokers might desire a smoking article that is capable of selectively moistening, cooling, or otherwise modifying the nature or character of the mainstream smoke generated by that smoking article. See, for example, U.S. Pat. Nos. 7,240,678 to Crooks et al., 7,237,558 to Clark et al., 7,115,085 to Deal, 5,240,015 to Rosen et al., 5,041,422 to Narula et al., 5,021,184 to Gillaspey et al., and 4,956,481 to Gillaspey et al. However, because certain agents that can be used to interact with smoke are volatile and have the propensity to evaporate over time, the effects of those agents upon the behavior of those smoking articles may require introduction of those agents near commencement of the smoking experience. Accordingly, it is desirable to provide a smoking article that is capable of selectively moistening, smoothing or cooling the smoke delivered to a smoker, at the discretion of that smoker, for example, by crushing the capsule incorporated in the filter and containing the agents.

It is also desirable to provide smokeless tobacco products with the capability to selectively modify the flavor delivered to the user. Examples of various smokeless tobacco products are described in U.S. patent application Ser. Nos. 11/461,633, Aug. 1, 2006 to Mua et al.; and, 11/781,666, filed Jul. 23, 2007, to Mua et al.; and U.S. Pat. Appl'n Pub. No. 2007/0186941 to Holton Jr. et al, which are incorporated herein by reference. For example, Holton Jr. et al, discloses the use of a flavor-containing breakable capsule in a snus pouch.

The capsules incorporated in the tobacco products can be manufactured using various materials and by various methods. For example, alginates can be used to manufacture capsules to be incorporated into smoking articles. See, for example, U.S. Pat. Nos. 7,249,605 to MacAdam et al., 7,240,678 to Crooks et al., 7,237,558 to Clark et al., 6,631,722 to MacAdam et al., 6,470,894 to Hersh et al., 5,727,571 to Meiring et al., and 5,303,720 to Banerjee et al. Alginates, which are derived from brown seaweeds, are widely used in the food and pharmaceutical industries. The monovalent salts, especially sodium alginates, are mass-produced by many manufacturers all around the world, and are relatively inexpensive. Alginate capsules are commonly prepared by introducing and maintaining alginate drops in a single bath containing multivalent ions for a period of time. A film of gel is formed around the drops to afford the alginate capsules. Representative methods to manufacture alginate capsules using the single ionic bath approach are set forth in U.S. Pat. Nos. 6,627,236 to Barbeau et al., 4,701,326 to Nelsen et al., 5,139,783 to Handjani et al., 5,093,130 to Fujii et al., 4,780,987 to Nelsen et al., and 2,800,457 to Green et al., each of which is incorporated herein by reference in their entireties. However, it is often difficult to obtain capsules having desirable physical characteristics, for example, when the capsules are desired to be used in a breakable form in cigarette filters.

Accordingly, there is a need for an improved process to manufacture capsules having desirable physical characteristics.

BRIEF SUMMARY OF THE INVENTION

In one embodiment, a method for manufacturing breakable capsules that are useful for incorporating into a tobacco product is provided. The method comprises forming a plurality of droplets comprising a core composition and a coating composition. The coating composition comprises a material that gelates in contact with a multivalent ion. The method also comprises introducing the plurality of droplets in a first aqueous solution having a first concentration of a first multivalent ion such that the coating composition of the plurality of droplets gelates to form a plurality of raw capsules. The method further comprises introducing the plurality of raw capsules in a second aqueous solution having a second concentration of a second multivalent ion, wherein the second concentration is higher than the first concentration, such that the coating composition of the plurality of raw capsules hardens to form a plurality of breakable capsules.

In a second embodiment, another method for manufacturing breakable capsules that are useful for incorporating into a tobacco product is provided. The method comprises forming a plurality of droplets comprising a core composition and a coating composition. The core composition is enclosed by the coating composition. The method also comprises introducing the plurality of droplets into a first aqueous solution comprising a first multivalent ion, wherein the coating composition gelates in contact with the first multivalent ion in the first aqueous solution to form a plurality of raw capsules, and wherein the first multivalent ion continues to diffuse into the coating composition of the plurality of raw capsules. The method further comprises introducing the plurality of raw capsules in a second aqueous solution comprising a second multivalent ion, wherein the plurality of raw capsules hardens to form a plurality of breakable capsules.

In another embodiment, a method for making a hollow capsule containing liquid payloads that is useful for incorporating into a tobacco product is provided. The method comprises forming a droplet comprising a liquid payload core surrounded by a shell composition comprising a viscous non-animal based film-forming material, and introducing the droplet into a first aqueous solution comprising a first multivalent ion selected from the group consisting of iron and calcium, in a concentration of less than about 1 weight %, and allowing the droplet to remain in the first aqueous solution for less than about 30 minutes. The method further comprises maintaining the droplet in a second aqueous solution comprising a second multivalent ion selected from the group consisting of iron and calcium, in a concentration of more than about 5 weight %, and allowing the droplet to remain in the second aqueous solution for more than about 6 hours to form the hollow capsule.

DETAILED DESCRIPTION OF THE INVENTION

Figure 1:
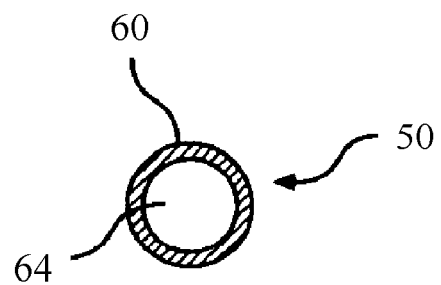
FIG. 1 is a cross-sectional view of one embodiment of a breakable capsule.

The following various embodiments are described in the context of a spherical capsule. Although a spherical capsule is a preferred object to be inserted, one of ordinary skill in the art may appreciate that other objects having the same or different shape may be inserted into cigarette filters in accordance with the teachings herein. Therefore, reference to capsule is to be understood to be illustrative and not limiting the invention. Like numerals in different figures refer to like parts.

It has been discovered that one disadvantage of using a single ionic bath for manufacturing breakable gel capsules is the difficulty in controlling the gelling time, the hardness, and the thickness of the outer layer of the capsules. For example, when a high concentration ionic bath is used, the gelling time is shorter but the capsules tend to have thin outer shells because the initially formed outer shell during the gelling of the drops in the high concentration solution is so thick that it prevents the ions in the ionic bath from diffusing into the inside of the outer layer of the drops. Conversely, when a low concentration ionic bath is used, the ions in the ionic bath are able to diffuse into the inside of the outer layer of the drops more readily but the gelling time is longer and the formed capsules are not as hard as the capsules formed in a high concentration solution.

A preferred embodiment of the present disclosure provides a method to control the gelling time, the thickness and hardness of the capsules using a novel two-step process. In one embodiment, a method is provided for manufacturing breakable capsules that are useful for incorporating into a tobacco product. The method comprises forming a plurality of droplets comprising a core composition and a coating composition. The coating composition comprises a material that gelates in contact with a multivalent ion. The method then comprises introducing the plurality of droplets in a first aqueous solution having a first concentration of a first multivalent ion such that the coating composition of the plurality of droplets gelates to form a plurality of raw capsules. The method further comprises introducing the plurality of raw capsules in a second aqueous solution having a second concentration of a second multivalent ion, wherein the second concentration is higher than the first concentration, such that the coating composition of the plurality of raw capsules hardens to form a plurality of breakable capsules.

As used herein, the term "gelate" or "gelates" means the formation of a gel-like product, such as a soft gel, from a liquid or a viscous starting material or the formation of a hardened product from the gel-like product. Both the gel-like product and the hardened product can have any shape. Gelating can occur, for example, upon a change in temperature or in the ionic environment. Gelating can be due to covalent binding (such as cross-linking) between the starting materials. Alternatively, the binding force in the gelation product can be non-covalent, such as hydrogen bonds, ionic interactions, Van der Waals interactions, and so on.

In the method discussed above, the plurality of droplets can be formed using any available droplet formation methods. In one example, the plurality of droplets is formed by a co-extrusion method. Preferably, the core composition is co-extruded through a central orifice and the coating composition through a concentric annular orifice surrounding the central orifice to form the plurality of droplets comprising the core composition surrounded by the coating composition.

Any multivalent ions can be used in the method. Suitable multivalent ions include, but are not limited to, Fe, Ca, Zn, Ba, Pb, Sr, Al, Cu, Mn, and Cd ions. Alternatively, inorganic multivalent ions can be used in the method. For example, when an alginate is used as the coating composition, various ions can be used to form the raw capsules and the hardened breakable capsules. Preferably, the ions used in the method are multivalent ions. Monovalent salts of the alginates, such as sodium alginates and potassium alginates, are water soluble, but are insoluble in many organic solvents. Multivalent alginate gels, such as calcium alginates and ferric alginates, do not dissolve in most solvents. For example, the multivalent alginate capsules are not soluble in glycerol triacetate or in water. They, however, can dissolve in water in strong basic conditions or in the presence of $Ca^{2+}$ or $Fe^{3+}$ chelators.

Preferably, the first multivalent ion and the second multivalent ion are iron or calcium ions. The first multivalent ion and the second multivalent ion can be either identical or different. In one example, the second aqueous solution comprises both the first multivalent ion and the second multivalent ion. The first concentration of the first multivalent ion is less than about 10 weight %. Preferably, the first concentration is less than about 5 weight % of the ions. More preferably, the first concentration is less than about 3 weight %. Even more preferably, the first concentration is less than about 1 weight %. In one example, the first concentration is about 0.5 weight % of the ions. The plurality of droplets is preferably maintained in the first solution for less than about 1 hour. More preferably, the droplets are maintained in the first solution for less than about 30 minutes, even more preferably for less than about 20 minutes. In one example, the droplets are maintained in the first solution for less than about 10 minutes.

In one example, the second concentration of the second multivalent ion in the method is more than about 5 weight % of the ions. More preferably, the second concentration is more than about 15 weight %. In another example, the second concentration is more than about 30 weight % of the ions. The plurality of raw capsules is preferably maintained in the second solution for more than about 1 hour. More preferably, the raw capsules are maintained in the second solution for more than about 2 hours, even more preferably for more than about 3 hours. In one example, the raw capsules are maintained in the second solution for more than about 6 hours.

Preferably, when the plurality of droplets is in the first aqueous solution, the first multivalent ion continues to diffuse into the coating composition of the plurality of raw capsules. Preferably, the gelation of the plurality of droplets is sufficiently quick that the formed raw capsules do not stick to each other.

Preferably, the coating composition comprises a non-animal based film-forming material. In one example, the non-animal based film-forming material contains carboxyl groups to react with the multivalent ions. More preferably, the non-animal based film-forming material is alginate, starch, chemical treated starch, or pectin. Any chemical treatment method that increases the number of carboxyl groups in the non-animal based film-forming material can be used. Most preferably, the non-animal based film-forming material is an alginate. Alginates are thermally stable cold-setting gelling agents. In the presence of calcium ions or other divalent ions, alginates gelate at far lower concentrations than gelatin. Such alginate gels can be heal-treated without melting, although they may eventually degrade. Alginates also react with multivalent ions, such as $Fe^{3+}$ and $Al^{3+}$, to form hard and brittle gels, comparing to calcium alginate gels. Any type of alginates can be used. In one example, the alginate is a linear co-polymer comprising two monomeric units, D-mannuronic acid and L-guluronic acid. The alginate co-polymer comprises blocks comprising substantially exclusively of one monomeric unit or the other, commonly referred to as M-blocks or G-blocks. The M-blocks or G-blocks alternate in the alginate co-polymer. Alginates with high G-block contents produce strong brittle gels with good heat stability. Alginates with high M-block contents produce weaker but more elastic gels.

Preferably, the hardened coating composition of the breakable capsules is substantially insoluble in water and in glycerol triacetate. In one example, the coating composition of the breakable capsules is sufficiently hardened such that it breaks with an audible sound when crushed. In one example, the crush strength of the breakable capsules manufactured by the method discussed above is from about 100 g to 2,000 g, preferably from about 150 g to 1,500 g, and more preferably from about 250 g to about 1,000 g. Preferably, the breakable capsules retain a crush strength of at least 250 g after being exposed for a period of at least five minutes to an atmosphere having a relative humidity of about 90%.

The size of the capsules may vary, for example, by controlling the co-extruding speed of the coating composition and the core composition, or by adjusting the viscosity of the two compositions. In one example, the breakable capsules have a substantially spherical shape and have a diameter of about 6.0 mm to about 7.0 mm.

In another embodiment, it is provided a method for manufacturing breakable capsules that are useful for incorporating into a tobacco product. The method comprises forming a plurality of droplets comprising a core composition and a coating composition. The core composition is enclosed by the coating composition. The method also comprises introducing the plurality of droplets into a first aqueous solution comprising a first multivalent ion. The coating composition gelates in contact with the first multivalent ion in the first aqueous solution to form a plurality of raw capsules, and the first multivalent ion continues to diffuse into the coating composition of the plurality of raw capsules. The method further comprises introducing the plurality of raw capsules in a second aqueous solution comprising a second multivalent ion. The plurality of raw capsules hardens to form a plurality of breakable capsules.

As discussed above, any suitable method can be used to form the plurality of droplets. In one example, the plurality of droplets is formed by co-extruding the core composition and the coating composition. The size of the droplets can be controlled by the ratio of co-extruding speeds of the core composition and the coating composition. The viscosity of the coating composition during co-extrusion is between about 100 cP and about 10,000 cP, preferably between about 200 and about 5,000 cP.

In yet another embodiment, it is provided a method for making a hollow capsule containing liquid payloads that is useful for incorporating into a tobacco product. The method comprises forming a droplet comprising a liquid payload core surrounded by a shell composition comprising a viscous non-animal based film-forming material. The method also comprises introducing the droplet into a first aqueous solution comprising a first multivalent ion selected from the group consisting of iron and calcium, in a concentration of less than about 1 weight %, and allowing the droplet to remain in the first aqueous solution for less than about 30 minutes. The method further comprises maintaining the droplet in a second aqueous solution comprising a second multivalent ion selected from the group consisting of iron and calcium, in a concentration of more than about 5 weight %, and allowing the droplet to remain in the second aqueous solution for more than about 6 hours to form the hollow capsule.

In one example, additional multivalent ion is added to the first aqueous solution in sufficient quantity to increase the concentration of the first aqueous solution to form the second aqueous solution. In one example, the additional multivalent ion comprises the first multivalent ion, and the first multivalent ion is identical to the second multivalent ion. In another example, the additional multivalent ion comprises the second multivalent ion, and the first multivalent ion is different from the second multivalent ion. The second aqueous solution comprises both the first multivalent ion and the second multivalent ion. At least some of the first multivalent ion gelated into the droplet is replaced by the higher concentration second multivalent ion. In yet another example, the droplet is removed from the first aqueous solution and then introduced into the second aqueous solution. The first multivalent ion and the second multivalent ion can be either identical or different.

Preferably, the droplet is maintained in the second aqueous solution at a sufficiently high concentration for a sufficiently long time such that the shell of the hollow capsule has a crush strength of between about 100 g to 2,000 g, preferably from about 150 g to 1,500 g, and more preferably from about 250 g to about 1,000 g.

In the methods discussed above, the capsules can further be dried using any suitable methods, such as air drying, vacuum drying, and heating. Excessive drying however should be avoided to prevent dehydration and deformation of the capsules. During storage, the capsules are sealed tightly in a container or stored in an environment with a suitable humidity to avoid possible shrinking of the capsules. Preferably, the hardened coating composition forms a moisture barrier layer.

The novel two-step capsule-making process can be used to produce capsules, such as alginate capsules, that are substantially spherical, smooth and uniform. In one example, the capsules are substantially void of dimples, bumps, or the like. In another example, the capsules have a clean outer surface with substantially no flow agents, powders or loose materials after drying. Capsules made from the shell and the encapsulated core composition, such as flavoring materials, are hard and brittle with an audible sound when crushed. The capsules maintain their hard, brittle nature in an environment of about 90% relative humidity. In one example, the breakable capsules retain a crush strength of at least 250 g after being exposed for a period of at least five minutes to an atmosphere having a relative humidity of about 90%. Optionally, wetting agents, such as glycerol and propylene glycol, can be added to the coating composition of alginate capsules, such as ferric alginate capsules to prevent water loss from the capsules.

Capsules based on alginate are dark brown or dark blue in appearance. For example, although pure alginate gels are colorless, the calcium alginate capsules gelled from commercially available sodium alginate are lightly brown because the sodium alginate is extracted from brown seaweeds. Ferric alginate capsules are brown or dark brown because of the color of $Fe^{3+}$ ions. The color of the capsules can also be changed by adding nontoxic pigment in the alginate capsules. The physical property of alginate capsules can be controlled by adjusting the M-block to G-block ratio, water content, $Ca^{2+}$ and $Fe^{3+}$ concentrations, and alginate content in the capsules.

The novel methods discussed above can be used to manufacture various breakable capsules. Representative types of capsules are of the type used in food products commercially available as "Momints" by Yosha! Enterprises, Inc. and "Ice Breakers Liquid Ice" from The Hershey Company, USA. Representative types of capsules also have been incorporated in chewing gum, such as the type of gum marketed under the tradename "Cinnaburst" by Cadbury Adams USA. Representative types of capsules and components thereof also are set forth in U.S. Pat. Nos. 3,339,558 to Waterbury; 3,390,686 to Irby, Jr. et al.; 3,685,521 to Dock; 3,916,914 to Brooks et al.; 4,889,144 to Tateno et al. 6,631,722 to MacAdam et al.; and 7,115,085 to Deal; U.S. Pat. Appl'n. Pub. Nos. 2004/0261807 to Dube et al.; 2006/0272663 to Dube et al., 2006/01330961 to Luan et al., 2006/0144412 to Mishra et al., 2007/0012327 to Karles et al.; and 2007/0068540 to Thomas et al.; U.S. patent application Ser. No. 11/760,983 filed Jun. 11, 2007 to Stokes et al.; PCT WO 03/009711 to Kim; PCT WO2006/136197 to Hartmann et al.; PCT WO 2006/136199 to Mane et al., PCT WO 2007/010407; and PCT WO 2007/060543, as well as within filtered cigarettes that have been marketed under the tradename "Camel Lights with Menthol Boost" by R. J. Reynolds Tobacco Company, which are incorporated herein by reference. See also, the types of capsules and components thereof set forth in U.S. Pat. Nos. 5,223,185 to Takei et al.; 5,387,093 to Takei; 5,882,680 to Suzuki et al.; 6,719,933 to Nakamura et al. and 6,949,256 to Fonkwe et al.; and U.S. Pat. Appl'n. Pub. Nos. 2004/0224020 to Schoenhard; 2005/0123601 to Mane et al.; 2005/0196437 to Bednarz et al.; and 2005/0249676 to Scott et al.; which are incorporated herein by reference. The capsules may be colored, provided with smooth or rough surfaces, have rigid or pliant shells, have brittle or durable shells, or other desired features or characters.

In one example, breakable capsules containing various flavoring components (flavorants) as payload or core composition may be manufactured by the novel two-step method and incorporated into tobacco products. As used herein, the terms "flavorant" and "flavoring ingredient" refer to substances, such as liquids or solids, that provide a concentrated release for a sensory effect such as, for example, taste, mouthfeel, moistness, coolness/heat, and/or fragrance. Flavor materials, such as menthol mixed with a non-water soluble solvent, will be encapsulated within the shell to form capsules. Flavor materials may range from neat organic materials, to essential oils, to mixtures of flavor chemicals. Flavorants may be natural or synthetic, and the character of these flavors imparted thereby may be described, without limitation, as fresh, sweet, herbal, confectionary, floral, fruity or spice. Specific types of flavors include, but are not limited to, vanilla, coffee, chocolate/cocoa, cream, mint, spearmint, menthol, peppermint, wintergreen, eucalyptus, lavender, cardamon, nutmeg, cinnamon, clove, cascarilla, sandalwood, honey, jasmine, ginger, anise, sage, licorice, lemon, orange, apple, peach, lime, cherry, strawberry, and any combinations thereof. See also, Leffingwell et al., Tobacco Flavoring for Smoking Products, R. J. Reynolds Tobacco Company (1972), the entirety of which is incorporated herein by reference. Flavorings also may include components that are considered moistening, cooling or smoothening agents, such as eucalyptus. These flavors may be provided neat (i.e., alone) or in a composite (e.g., spearmint and menthol, or orange and cinnamon). Representative types of components also are set forth in U.S. Pat. No. 5,387,416 to White et al.; U.S. Pat. App. Pub. Nos. 2005/0244521 to Strickland et al. and 2007/0186941 to Holton Jr. et al.; and PCT Application Pub. No. WO 05/041699 to Quinter et al., each of which is incorporated herein by reference.

Optionally, the flavorants contained in the capsules can include other compositions. For example, some core composition and payload of the capsules include a carrier material (i.e., a matrix material) and a flavorant dispersed therein, and allow for controlled delivery of the flavorant. For example, representative types of materials and ingredients useful for the manufacture of essentially water insoluble flavored beads, strands or pellets may be found within the filters of cigarettes available as Camel Dark Mint, Camel Mandarin Mint, Camel Spice Crema, Camel Izmir Stinger, Camel Spice Twist, Camel Mandalay Lime and Camel Aegean Spice by R. J. Reynolds Tobacco Company.

Capsules preferably are shaped, sized, and of a texture that provides for comfortable and convenient use. More preferably, the payload in the capsules does not include beans, nibs, sticks, nuts, or other similar solids, such as food-related solids taken directly from plants, that would not provide the controlled, concentrated release of a flavorant. Other object configurations may be used in combination with a hollow capsule. Optionally, combinations of different forms of flavor agents may be used to deliver combinations of different flavors or the same flavors. Each form of the flavor agents may be tailored to provide different release characteristics of the flavoring ingredient(s) such as, for example, quick-release, delayed release, sustained release, or a combination thereof.

The size and weight of each capsule may vary depending upon the desired properties it is to impart to the tobacco product. Preferred capsules are generally spherical in shape. However, suitable capsules may have other types of shapes, such as generally rectilinear, oblong, elliptical, or oval shapes. Exemplary smaller spherical capsules have diameters of at least about 1.5 mm, generally at least about 2 mm, often at least about 2.5 mm, and frequently at least about 3 mm. Exemplary larger spherical capsules have diameters of less than about 7 mm, generally less than about 6 mm, and often less than about 5 mm. Preferably the capsules are about 3.5 mm in diameter. Exemplary smaller individual capsules weigh at least about 5 mg, often at least about 15 mg, and frequently at least about 25 mg. Exemplary larger individual capsules weigh less than about 75 mg, generally less than about 65 mg, and often less than about 55 mg.

The capsule may be purposefully crushed by application of pressure to release the flavoring ingredients. Such a release of flavoring ingredient may alter or enhance the flavor of the product, as well as extending the period of time that a user may enjoy the product.

The method to incorporate the capsules into smoking articles may vary. For example, the capsules can be incorporated into smoking articles using methods as disclosed in co-owned U.S. Pat. Pub. Nos. 2007/0068540 to Thomas et al., published Mar. 29, 2007, and 2007/0186941 to Holton et al., published Aug. 16, 2007, and U.S. patent application Ser. No. 11/760,983, filed Jun. 11, 2007 to Stokes et al., each of which is incorporated herein by reference in their entireties.

Preferably, at least one capsule is incorporated within each smoking article. For example, a single capsule may be, incorporated within each smoking article. Alternatively, a plurality of capsules may be included within each smoking article. For example, two or more capsules may be included in each smoking article, and the number of capsules in each smoking article preferably is selected based upon factors including the size of the smoking article, the capsule size, the desired mouthfeel, the desired sensory effect (e.g., taste, coolness/warmth), and the like. If desired, capsules of different sizes and/or of different types (e.g., differing shell materials, differing shell properties such as shape or hardness and/or differing capsule-contained components) may be incorporated within the product. In this manner, different capsules may be incorporated into the product to provide desired properties (e.g., mouthfeel, flavor, other sensory effect), and/or to provide release of encapsulated components at different times during the use of the product. For example, a first flavoring ingredient may be released by crushing a first capsule, and a second flavoring ingredient, contained in a second capsule, may not be released until a later time when the second capsule is crushed.

Referring to FIG. 1, a representative capsule 50 is generally spherical in shape. Such a capsule possesses an outer shell 60 that surrounds an internal payload 64. The outer shell 60 most preferably encloses the payload 64 in such a manner that the payload is tightly sealed. The shape of the capsule can vary, but the capsule most preferably is spherical. Most preferably, the capsules have high degrees of roundness, and possess consistent physical specifications (e.g., consistent dimensions, consistent weights and consistent formulations) in order to enhance the ability to manufacture cigarettes incorporating those capsules using automated machinery, and in order to produce cigarettes of consistent quality. Suitable capsules that can be made by the novel method discussed herein include, but are not limited to, capsules with encapsulated mixtures of medium chain triglycerides and flavor agents.

The capsule outer shell or surface 60 is preferably constructed of somewhat rigid solid material that has a tendency not to leak, melt, crack, or otherwise lose its integrity between the time that it is manufactured and the time it is selectively ruptured by a smoker. Preferably, the capsule outer surface or wall 60 is a continuous sealed one-piece member in order to reduce the likelihood of leakage of the capsule payload. The preferred capsule outer surface 60 is brittle enough to readily rupture when squeezed by a smoker, but not so brittle that it breaks prematurely during manufacturing, packaging, shipping and use of the cigarette containing such a capsule. That is, the pressure required to rupture the capsule within the filter element is preferably low enough to be easily performed using the fingers of the smoker, but not so low as to result in accidental rupture of the cigarette during manufacturing, packaging, shipping, and smoking. Furthermore, the capsule outer surface preferably is constructed of material that does not adversely react with or otherwise undesirably affect the components of the payload, the cigarette tobacco, components of the filter element, or the mainstream smoke produced by the cigarette.

The capsule payload 64 can have a form that can vary; and typically, the payload has the form of a liquid, a gel, or a solid (e.g., a crystalline material or a dry powder). The payload 64 can incorporate components that aid in flavoring or scenting mainstream cigarette smoke. Alternatively, the payload may be a breath freshening agent for the smoker, a deodorizing agent for the cigarette butt, a moistening or cooling agent for the cigarette smoke, or a composition capable of otherwise altering the nature or character of the cigarette.

The payload 64 most preferably has a liquid form. Such a payload can incorporate an aromatic material intended to be drawn to the smoker independent of the presence of mainstream smoke, or material can become entrained within mainstream smoke during draw by the smoker. Preferred liquid payloads have the ability to seep or wick throughout the filter material of the filter element (and in certain circumstances, into the tobacco rod), and hence be available to mix with the smoke drawn to the smoker.

In a preferred embodiment, the capsule 50 possesses an outer surface 60 composed of the non-animal based film-forming material and an internal payload incorporating an agent capable of altering the nature or character of mainstream smoke passing through the filter element. Typically, the outer shell 60 consists primarily of the non-animal based film-forming material, frequently is comprised at least about 80 weight percent the non-animal based film-forming material, and preferably consists essentially of the non-animal based film-forming material. The non-animal based film-forming material is preferably of a food grade. A wide variety of the non-animal based film-forming material may be used.

In one example, the non-animal based film-forming material contains carboxyl groups to react with the multivalent ions. More preferably, the non-animal based film-forming material is alginate, starch, chemical treated starch, or pectin. Any chemical treatment method that increases the number of carboxyl groups in the non-animal based film-forming material can be used. Most preferably, the non-animal based film-forming material is an alginate. The type of the non-animal based film-forming material used for constructing the outer shell of the capsule provides that capsule with the capability of being exposed to triacetin (a common plasticizer used in cigarette filter manufacture) or 1,2 propylene glycol (a common tobacco casing component) for relatively long periods of time without experiencing undesirable interaction (e.g., dissolution of the gelatin therein). The capsules can be colored brown, or some other dark color, for assisting in detection purposes during automated manufacturing processes.

In the preferred embodiment, the payload is a mixture of a flavoring and a diluting agent or carrier. The preferred diluting agent is a triglyceride, such as a medium chain triglyceride, and more particularly a food grade mixture of medium chain triglycerides. See, for example, Radzuan et al., Porim Bulletin, 39, 33-38 (1999). Flavorings of the payload may be natural or synthetic, and the character of these flavors can be described, without limitation, as fresh, sweet, herbal, confectionary, floral, fruity or spice. Specific types of flavors include, but are not limited to, vanilla, coffee, chocolate, cream, mint, spearmint, menthol, peppermint, wintergreen, lavender, cardamon, nutmeg, cinnamon, clove, cascarilla, sandalwood, honey, jasmine, ginger, anise, sage, licorice, lemon, orange, apple, peach, lime, cherry, and strawberry. See also, Leffingwill et al., Tobacco Flavoring for Smoking Products, R.J. Reynolds Tobacco Company (1972). Flavorings also can include components that are considered moistening, cooling or smoothening agents, such as eucalyptus. These flavors may be provided neat (i.e., alone) or in a composite (e.g., spearmint and menthol, or orange and cinnamon). Composite flavors may be combined in a single capsule as a mixture, or as components of multiple capsules positioned within the filter element.

The amount of flavoring and diluting agent within the capsule may vary. The relative amounts of flavoring and diluting agent selected, as well as the overall amount of the mixture of the two may be varied, for example, to provide different sensory experiences for the smoker. In some instances, the diluting agent may be eliminated altogether, and the entire payload can be composed of flavoring agent. Alternatively, the payload can be almost entirely comprised of diluting agent, and only contain a very small amount of relatively potent flavoring agent. In one embodiment using a capsule of approximately 3.5 mm in diameter, the weight of the liquid payload (e.g., flavoring agent and diluting agent) is preferably in the range of about 15 mg to about 25 mg, and more preferably in the range of about 20 mg to about 22 mg. The preferred composition of the mixture of flavoring and diluting agent is in the range of about 5 percent to about 25 percent flavoring, and more preferably in the range of about 10 to about 15 percent flavoring, by weight based on the total weight of the payload, with the balance being diluting agent.

The weight of the capsule wall compared to the weight of the payload may vary. Preferably, the capsule wall is in the range of about 5 percent to about 50 percent, and more preferably in the range of about 10 to about 30 percent, of the total weight of the capsule. For a representative capsule of approximately 3.5 mm in diameter, the capsule wall weighs about 2 mg to about 4 mg, and the payload weighs about 16 mg to about 21 mg. The payload volume typically can be about 50 percent to about 90 percent of the total volume of the capsule (i.e., including the wall and the payload), preferably about 70 percent to about 90 percent of the total capsule volume, and more preferably about 80 percent to about 90 percent of the total capsule volume.

The force required to rupture the preferred capsules before they are inserted into the filter element may be determined using a suitable force determining device, such as the Shimpo Model No. FGV10X manufactured by Shimpo Instruments, a division of the Nidec Group. When measured using a suitable device, such as the Shimpo device, the capsules preferably have individual crush strengths in the range of approximately 100 to 2000, more preferably in the range of approximately 150 to 1500, and still more preferably in the range of approximately 250 to 1000 (units provided by the Shimpo device are reported in grams).

Other capsules and capsule components that can be manufactured by the novel method of the present invention are of the type set forth in U.S. Pat. Nos. 3,685,521 to Dock; 3,916, 914 to Brooks et al., and 4,889,144 to Tateno et al.; U.S. Pat. Appl. No. 2003/0098033 to MacAdam et al.; PCT WO 03/009711 to Kim; which are incorporated herein by reference.

Figure 2:
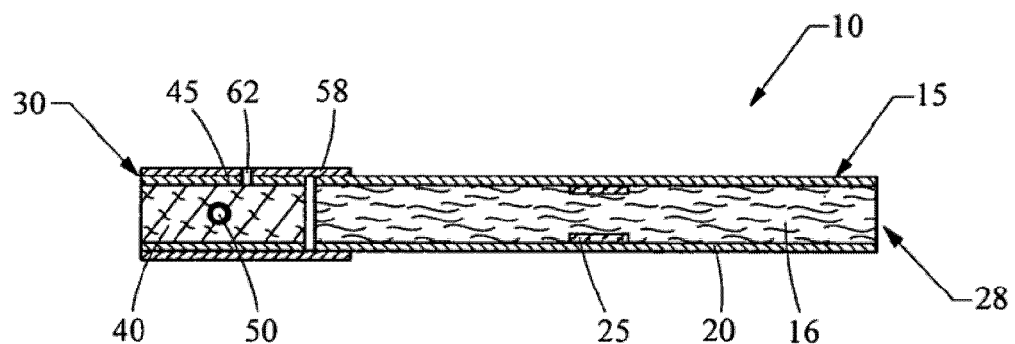
FIG. 2 is a cross-sectional view of a smoking article having the form of a cigarette, showing the smokable material, the wrapping material components, and the capsule-containing filter element of that smoking article.

Referring to FIG. 2, there is shown a smoking article 10, such as a cigarette, possessing certain representative components of a smoking article. The cigarette 10 includes a generally cylindrical rod 15 of a charge or roll of smokable filler material 16 contained in a circumscribing wrapping material 20. The rod 15 is conventionally referred to as a "tobacco rod." The ends of the tobacco rod are open to expose the smokable filler material. The cigarette 10 is shown as having one optional band 25 (e.g., a printed coating including a film-forming agent, such as starch, ethylcellulose, or sodium alginate) applied to the wrapping material 20, and that band circumscribes the cigarette rod in a direction transverse to the longitudinal axis of the cigarette. That is, the band provides a cross-directional region relative to the longitudinal axis of the cigarette. The band can be printed on the inner surface of the wrapping material (i.e., facing the smokable filler material) as shown, or less preferably, on the outer surface of the wrapping material. Although the cigarette can possess a wrapping material having one optional band, the cigarette also can possess wrapping material having further optional spaced bands numbering two, three, or more.

At one end of the tobacco rod 15 is the lighting end 28, and at the other end is positioned a filter element 30. The filter element 30 positioned adjacent one end of the tobacco rod 15 such that the filter element and tobacco rod are axially aligned in an end-to-end relationship, preferably abutting one another. Filter element 30 may have a generally cylindrical shape, and the diameter thereof may be essentially equal to the diameter of the tobacco rod. The ends of the filter element permit the passage of air and smoke therethrough. The filter element 30 includes filter material 40 (e.g., cellulose acetate tow impregnated with triacetin plasticizer) that is overwrapped along the longitudinally extending surface thereof with circumscribing plug wrap material 45. That is, the filter element 30 is circumscribed along its outer circumference or longitudinal periphery by a layer of plug wrap 45, and each end is open to expose the filter material 40.

Within the filter element 30 is positioned at least one capsule 50. The number of capsules within each filter element, most preferably is a pre-determined number, and that number can be 1, 2, 3, or more. Most preferably, each filter element contains a single capsule. Preferably, the capsule is disposed within the filter material 40 of the filter element, particularly towards the central region of the filter element. Most preferably, the nature of the filter material 40 is such that the capsule 50 is secured or lodged in place within the filter element 30. Each capsule 50 may carry a payload incorporating a compound that is intended to introduce some change to the nature or character of mainstream smoke drawn through that filter element (e.g., a flavoring agent). That is, the shell of hollow capsule 50 may be ruptured at the discretion of the smoker to release the capsule payload. Highly preferred capsules are capable of releasing the agent at the command of the user. For example, a preferred breakable hollow capsule containing a liquid payload is resistant to the release of the payload until the time that the smoker applies a purposeful application of physical force sufficient to rupture the hollow capsule. Typically, a filter material, such as cellulose acetate tow, is generally absorbent of liquid materials of the type that comprise the payload, and hence the released payload components are capable of undergoing wicking (or otherwise experiencing movement or transfer) throughout the filter element.

The filter element 30 is attached to the tobacco rod 15 using tipping material 58 (e.g., essentially air impermeable tipping paper), that circumscribes both the entire length of the filter element 30 and an adjacent region of the tobacco rod 15. The inner surface of the tipping material 58 is fixedly secured to the outer surface of the plug wrap 45 and the outer surface of the wrapping material 20 of the tobacco rod, using a suitable adhesive; and hence, the filter element and the tobacco rod are connected to one another. The tipping material 58 connecting the filter element 30 to the tobacco rod 15 can have indicia (not shown) printed thereon. A ventilated or air diluted smoking article can be provided with an optional air dilution means, such as a series of perforations 62, each of which extend through the tipping material and plug wrap.

The capsules may also be used in smokeless tobacco products, not shown herein. For example, the capsules may be incorporated inside of a snus smokeless tobacco pouch in a manner similar to that described in U.S. Pat. Pub. No. 2007/0186941 to Holton Jr. et al. Depending on the size of the capsule, one or more of a breakable capsule may be inside of a single snus pouch. The hardness of the capsule may be modified, for example, to provide a suitable breakable property that is acceptable to a user crushing the capsule a user's teeth, or perhaps between the cheek and gums.

Example 600 mg of sodium alginate was slowly added into 20 mL deionic water while stirring. After the solid sodium alginate dissolved in water, 0.2 mL glycerol was added into the solution while stirring, to afford a beige solution. The sodium alginate solution and soya bean oil (water insoluble analog of menthol) were added dropwise from a specially designed syringe-like device (with two pumps to extrude two different solutions) into an about 0.5% $Fe(NO_3)_3$ solution while stirred gently. After about 30 minutes, the formed raw capsules in the $Fe(NO_3)_3$ solution were transferred to an about 15% $Fe(NO_3)_3$ solution to harden the raw capsules for about 12 hours. Most of the raw capsules settled to the bottom of the solution. Then, the hardened capsules were dried by soaking on tissue paper and air drying under room temperature for about 1 hour. The capsules are sealed tightly to avoid possible shrinking.

The two pumps extrude the sodium alginate solution in glycerol, and soya bean oil at different velocities, $V_1$ and $V_2$, respectively. The faster the sodium alginate solution in glycerol was extruded (higher $V_1$ value), the less oil was encapsulated in the capsules. Similarly, the faster the soya bean oil was extruded (higher $V_2$ value), the more oil was encapsulated in the capsules. A suitable $V_1$ and $V_2$ ratio could be elected to get a desirable shell/flavor ratio. Furthermore, the distance for a drop to fall from the extrusion device into the ferric nitrate solution must be sufficiently long such that the drop will have enough time to form a substantially spherical droplet. For example, a distance of more than about 30 cm was used the instant example.

When the spherical droplet meets the $Fe^{3+}$ ions in the solution, ferric alginate gels would form almost immediately. However, if the droplet meets the $Fe^{3+}$ ions in a high concentration, for example, a ferric solution with more than 10% weight percent, the gelation on the surface of the droplet would substantially block the diffusion of $Fe^{3-}$ into the inner part of the droplet. Hence, it is necessary to use a solution with a lower $Fe^{3+}$ concentration first to form relatively soft raw gels. The raw gels then can be hardened to form the capsules in a solution with a higher $Fe^{3+}$ concentration.

The diameter of the device opening and the viscosity of the sodium alginate solution affect the diameter of the formed capsules. When larger device opening and more viscous sodium alginate solution are used, bigger capsules are produced, and vice versa. Moreover, the formed capsules have higher crush strength if more ferric alginate and less water are used in the coating composition, and vice versa. The function of glycerol is to hold water within the capsules. Thus, when more glycerol is used, the formed capsules tend to have smaller crush strength.

The capsules prepared were spherical, smooth, uniform and brown in appearance. The capsule diameter was about 3.4 mm and the crush strength was about 900 g. The soya bean oil diffused into paper placed under the capsules when the capsules were crushed. According to the weigh of the capsules before and after crushing, the soya bean oil comprised more than 80 weight % of the capsules.

Many modifications and other embodiments of the invention will come to mind to one skilled in the art to which this invention pertains having the benefit of the teachings presented in the foregoing description; and it will be apparent to those skilled in the art that variations and modifications of the present invention can be made without departing from the scope or spirit of the invention. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for manufacturing breakable capsules that are useful for incorporating into a tobacco product, the method comprising:
    forming a plurality of droplets comprising a core composition and a coating composition, the coating composition comprising a material that gelates in contact with a multivalent ion;
    introducing the plurality of droplets in a first aqueous solution having a first concentration of a first multivalent ion such that the coating composition of the plurality of droplets gelates to form a plurality of raw capsules; and
    introducing the plurality of raw capsules in a second aqueous solution having a second concentration of a second multivalent ion, wherein the second concentration is higher than the first concentration, such that the coating composition of the plurality of raw capsules hardens to form a plurality of breakable capsules.

2. The method for manufacturing breakable capsules of claim 1, wherein the forming a plurality of droplets comprises co-extruding the core composition through a central orifice and the coating composition through a concentric annular orifice surrounding the central orifice to form the plurality of droplets comprising the core composition surrounded by the coating composition.

3. The method for manufacturing breakable capsules of claim 1, wherein the first multivalent ion and the second multivalent ion are each independently selected form the group consisting of Fe, Ca, Zn, Ba, Al, Cu, and Mn ions.

4. The method for manufacturing breakable capsules of claim 3, wherein the first multivalent ion and the second multivalent ion are each independently selected form the group consisting of iron and calcium ions.

5. The method for manufacturing breakable capsules of claim 1, wherein the first multivalent ion and the second multivalent ion comprise identical ions.

6. The method for manufacturing breakable capsules of claim 1, wherein the first concentration of the first multivalent ion is less than about 1%.

7. The method for manufacturing breakable capsules of claim 1, wherein the second concentration of the second multivalent ion is more than about 5%.

8. The method for manufacturing breakable capsules of claim 1, wherein the first multivalent ion continues to diffuse into the coating composition of the plurality of raw capsules when the plurality of droplets is in a first aqueous solution.

9. The method for manufacturing breakable capsules of claim 1, wherein the material comprises a non-animal based film-forming material.

10. The method for manufacturing breakable capsules of claim 9, wherein the non-animal based film-forming material is selected from a group consisting of alginate, starch, chemically treated starch, and pectin.

11. The method for manufacturing breakable capsules of claim 1, wherein the hardened coating composition of the breakable capsules is substantially insoluble in water.

12. The method for manufacturing breakable capsules of claim 1, wherein the hardened coating composition of the breakable capsules is substantially insoluble in glycerol triacetate.

13. The method for manufacturing breakable capsules of claim 1, wherein the coating composition of the breakable capsules is sufficiently hardened such that it breaks with an audible sound when crushed.

14. The method for manufacturing breakable capsules of claim 1, wherein the breakable capsules retain a crush strength of at least 250 g after being exposed for a period of at least five minutes to an atmosphere having a relative humidity of about 90%.

15. The method for manufacturing breakable capsules of claim 1, wherein the crush strength of the breakable capsules is from about 250 g to about 1,000 g.

16. The method for manufacturing breakable capsules of claim 1, wherein the breakable capsules have a substantially spherical shape and have a diameter of about 6.0 mm to about 7.0 mm.

17. A method for manufacturing breakable capsules that are useful for incorporating into a tobacco product, the method comprising:
forming a plurality of droplets comprising a core composition and a coating composition, the core composition enclosed by the coating composition;
introducing the plurality of droplets into a first aqueous solution comprising a first multivalent ion, wherein the coating composition gelates in contact with the first multivalent ion in the first aqueous solution to form a plurality of raw capsules, and wherein the first multivalent ion continues to diffuse into the coating composition of the plurality of raw capsules; and
introducing the plurality of raw capsules in a second aqueous solution comprising a second multivalent ion, wherein the plurality of raw capsules hardens to form a plurality of breakable capsules.

18. The method for manufacturing breakable capsules of claim 17, wherein the forming a plurality of droplets comprises co-extruding the core composition and the coating composition, and wherein the size of the droplets is controlled by the ratio of co-extruding speeds of the core composition and the coating composition.

19. The method for manufacturing breakable capsules of claim 17, wherein the forming a plurality of droplets comprises co-extruding the core composition and the coating composition, and wherein the viscosity of the coating composition during co-extrusion is between about 200 and about 5,000 cP.

20. The method for manufacturing breakable capsules of claim 17, further comprising drying the plurality of breakable capsules.

21. The method for manufacturing breakable capsules of claim 17, wherein the hardened coating composition forms a moisture barrier layer.

22. The method for manufacturing breakable capsules of claim 17, wherein the coating composition comprises a non-animal based film-forming material selected from a group consisting of alginate, starch, chemically treated starch, and pectin.

23. A method for making a hollow capsule containing liquid payloads that is useful for incorporating into a tobacco product, the method comprising:
forming a droplet comprising a liquid payload core surrounded by a shell composition comprising a viscous non-animal based film-forming material;
introducing the droplet into a first aqueous solution comprising a first multivalent ion selected from the group consisting of iron and calcium; and
maintaining the droplet in a second aqueous solution comprising a second multivalent ion selected from the group consisting of iron and calcium to form the hollow capsule.

24. The method for making a hollow capsule of claim 23, further comprising adding additional multivalent ion to the first aqueous solution in sufficient quantity to increase the concentration of the first aqueous solution to form the second aqueous solution.

25. The method for making a hollow capsule of claim 23, further comprising removing the droplet from the first aqueous solution and then introducing the droplet into the second aqueous solution.

26. The method for making a hollow capsule of claim 23, wherein the droplet is maintained in the second aqueous solution at a sufficiently high concentration for a sufficiently long time such that the shell of the hollow capsule has a crush strength of between about 250 g and about 1,000 g.

27. The method for making a hollow capsule of claim 23, wherein the first aqueous solution has a concentration of less than about 1 weight % of the first multivalent ion.

28. The method for making a hollow capsule of claim 23, wherein the droplet is allowed to remain in the first aqueous solution for less than about 30 minutes.

29. The method for making a hollow capsule of claim 23, wherein the second aqueous solution has a concentration of more than about 5 weight % of the second multivalent ion.

30. The method for making a hollow capsule of claim 23, wherein the droplet is allowed to remain in the second aqueous solution for more than about 6 hours to form the hollow capsule.

* * * * *